(12) United States Patent
Xie et al.

(10) Patent No.: US 10,816,731 B2
(45) Date of Patent: Oct. 27, 2020

(54) AUTOMATIC FIBER STRIPPING SYSTEM AND METHOD

(71) Applicants: Tyco Electronics (Shanghai) Co. Ltd., Shanghai (CN); TE Connectivity Corporation, Berwyn, PA (US); Shenzhen AMI Technology Co. Ltd., Guangdong (CN)

(72) Inventors: Fengchun Xie, Shanghai (CN); Qinglong Zeng, Guangdong (CN); Yu Zhang, Shanghai (CN); Dandan Zhang, Shanghai (CN); Lvhai Hu, Shanghai (CN); Roberto Francisco-Yi Lu, Berwyn, PA (US)

(73) Assignees: Tyco Electronics (Shanghai) Co. Ltd., Shanghai (CN); TE Connectivity Corporation, Berwyn, PA (US); Shenzhen AMI Technology Co. Ltd., Guangdong (CN)

( * ) Notice: Subject to any disclaimer, the term of this patent is extended or adjusted under 35 U.S.C. 154(b) by 8 days.

(21) Appl. No.: 15/897,786

(22) Filed: Feb. 15, 2018

(65) Prior Publication Data

US 2018/0172911 A1    Jun. 21, 2018

Related U.S. Application Data

(63) Continuation of application No. PCT/IB2016/054922, filed on Aug. 17, 2016.

(30) Foreign Application Priority Data

Aug. 17, 2015 (CN) .......................... 2015 1 0504106

(51) Int. Cl.
*G02B 6/245* (2006.01)
*G02B 6/44* (2006.01)
*G02B 6/38* (2006.01)

(52) U.S. Cl.
CPC .......... *G02B 6/245* (2013.01); *G02B 6/3833* (2013.01); *G02B 6/3885* (2013.01); *G02B 6/3898* (2013.01); *G02B 6/4403* (2013.01)

(58) Field of Classification Search
CPC . Y10T 83/04; Y10T 83/0333; Y10T 83/0378; Y10T 83/041; Y10T 83/0414;
(Continued)

(56) References Cited

U.S. PATENT DOCUMENTS 5,445,051 A * 8/1995 Carpenter ............ H02G 1/1256
81/9.51
5,456,148 A * 10/1995 Hoffa ................... H02G 1/1256
198/626.4

(Continued)

OTHER PUBLICATIONS

PCT Notification, The International Search Report and the Written Opinion of the International Searching Authority, dated Oct. 27, 2016, 11 pages.

*Primary Examiner* — Phong H Nguyen
(74) *Attorney, Agent, or Firm* — Barley Snyder

(57) ABSTRACT

An automatic fiber stripping system comprises a first stripping module, a second stripping module, and a heating device. The first stripping module and the second stripping module each have a stripping belt, a driven belt wheel, a driving belt wheel, and a stripping tool including a pressing portion. The stripping belts are tightened on the pressing portions and the stripping tools press the stripping belts on each of two opposite sides of an optical cable. A blade portion of one of the stripping tools cuts a notch in at least one of two side edges of an outer coating layer of the optical cable. The heating device heats and softens the outer coating layer of the optical cable. The stripping belts are driven to move relative to the optical cable by the driving belt wheels so as to strip off a segment of the outer coating layer from the notch.

17 Claims, 6 Drawing Sheets

(58) Field of Classification Search
CPC .. Y10T 83/0419; G02B 6/245; G02B 6/3833; G02B 6/3885; G02B 6/3898; G02B 6/4403
USPC .................................. 81/9.4, 9.51, 9.41, 9.42
See application file for complete search history.

(56) References Cited

U.S. PATENT DOCUMENTS

| | | | | |
|---|---|---|---|---|
| 5,664,324 | A * | 9/1997 | Hoffa | H02G 1/1256 29/33 M |
| 5,934,161 | A * | 8/1999 | Keene | H02G 1/1256 29/564.4 |
| 6,434,314 | B1 | 8/2002 | Gatica et al. | |
| 6,658,719 | B2 * | 12/2003 | Thoms | H02G 1/1256 140/149 |
| 2004/0205924 | A1 * | 10/2004 | Liu | B23Q 11/005 15/301 |
| 2014/0124140 | A1 | 5/2014 | Verheyden et al. | |

* cited by examiner

US 10,816,731 B2

AUTOMATIC FIBER STRIPPING SYSTEM AND METHOD

CROSS-REFERENCE TO RELATED APPLICATION

This application is a continuation of PCT International Application No. PCT/IB2016/054922, filed on Aug. 17, 2016, which claims priority under 35 U.S.C. § 119 to Chinese Patent Application No. 201510504106.X, filed on Aug. 17, 2015.

FIELD OF THE INVENTION

The present invention relates to an automatic fiber stripping system and, more particularly, to an automatic fiber stripping system for stripping an outer coating layer from an optical cable.

BACKGROUND

A fiber optic connector generally comprises a housing and a ferrule assembly assembled in the housing. The ferrule assembly comprises a ferrule and optical fibers inserted into bores of the ferrule. An existing method of manufacturing the ferrule assembly typically comprises: stripping off a length of an outer coating layer of an optical cable so as to expose the length of bare fiber; cleaning the exposed bare fiber so as to remove residues on the fiber, for example, residues of the outer coating layer; inserting the cleaned bare fiber into the bores of the ferrule; and lastly, heating and curing an adhesive in the ferrule so as to secure the fiber in the ferrule.

The outer coating layer is generally stripped off the cable manually. The manual stripping method is not efficient and it is easy to damage the fiber during stripping, reducing an optical performance of the fiber.

SUMMARY

An automatic fiber stripping system comprises a first stripping module, a second stripping module, and a heating device. The first stripping module and the second stripping module each have a stripping belt, a driven belt wheel, a driving belt wheel, and a stripping tool including a pressing portion. The stripping belts are tightened on the pressing portions and the stripping tools press the stripping belts on each of two opposite sides of an optical cable. A blade portion of one of the stripping tools cuts a notch in at least one of two side edges of an outer coating layer of the optical cable. The heating device heats and softens the outer coating layer of the optical cable. The stripping belts are driven to move relative to the optical cable by the driving belt wheels so as to strip off a segment of the outer coating layer from the notch.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
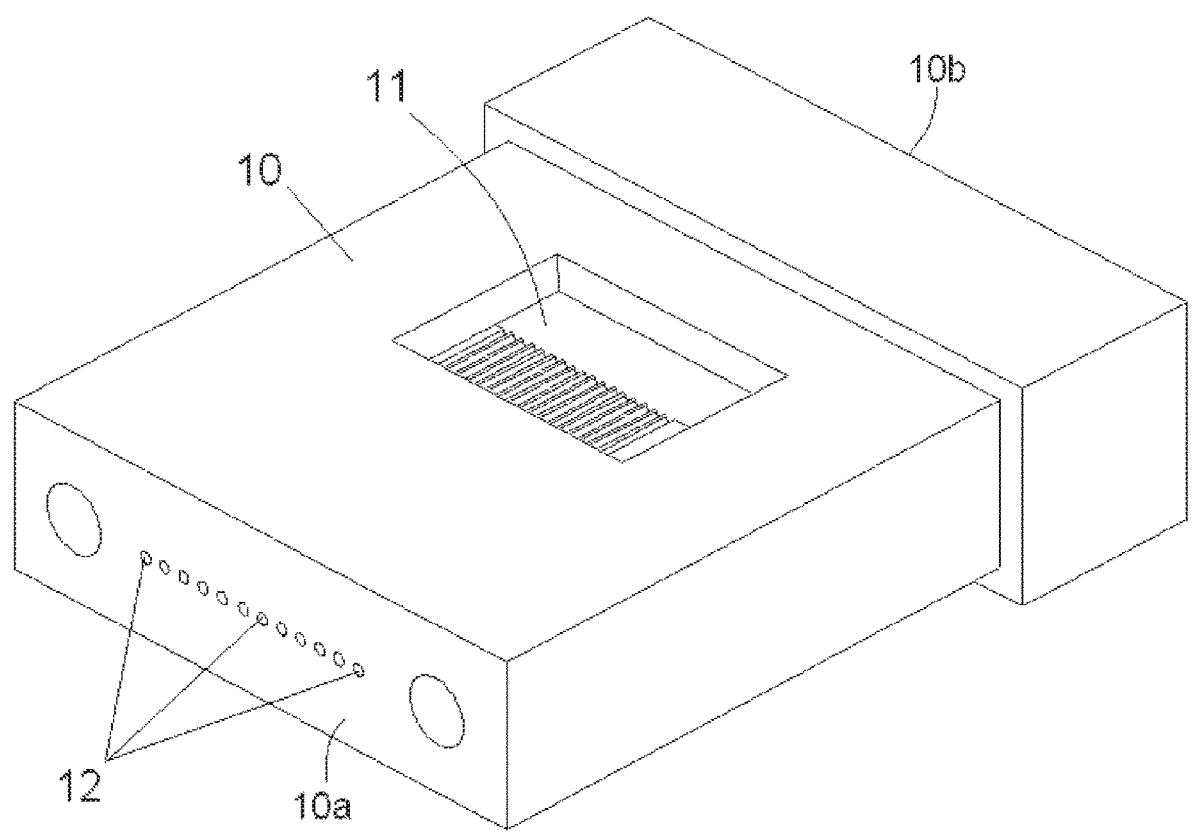
FIG. 1 is a perspective view of a multi-bore ferrule.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

Figure 2:
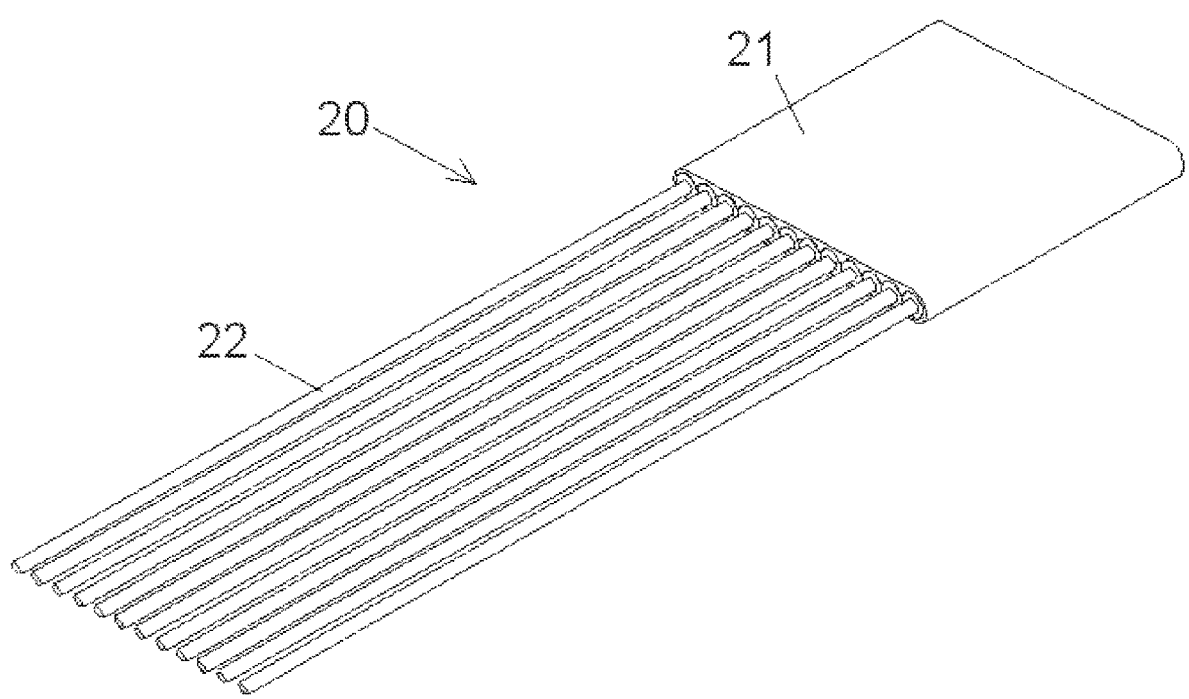
FIG. 2 is a perspective view of a ribbon cable.
Figure 3:
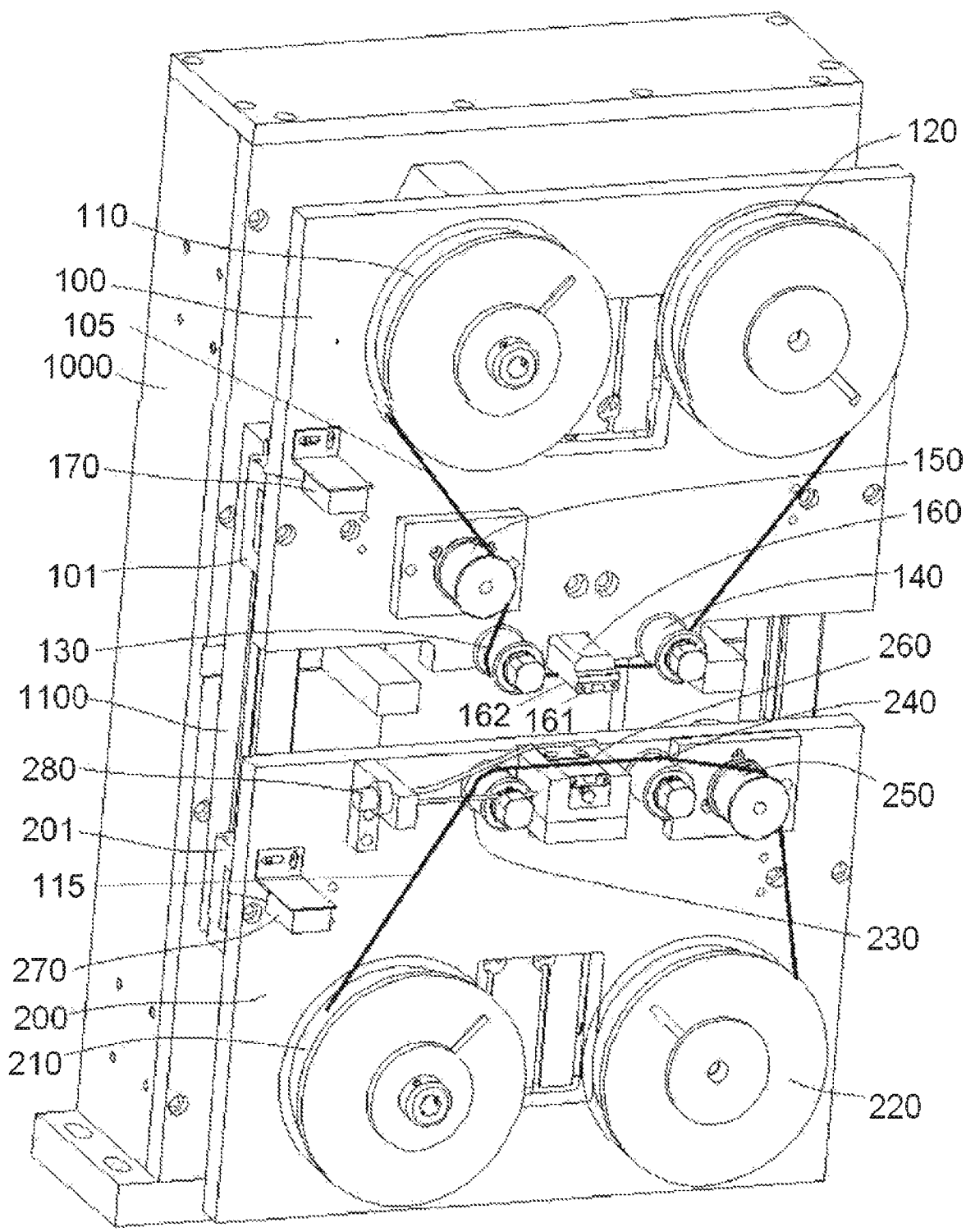
FIG. 3 is a perspective view of an automatic fiber stripping system.
Figure 4:
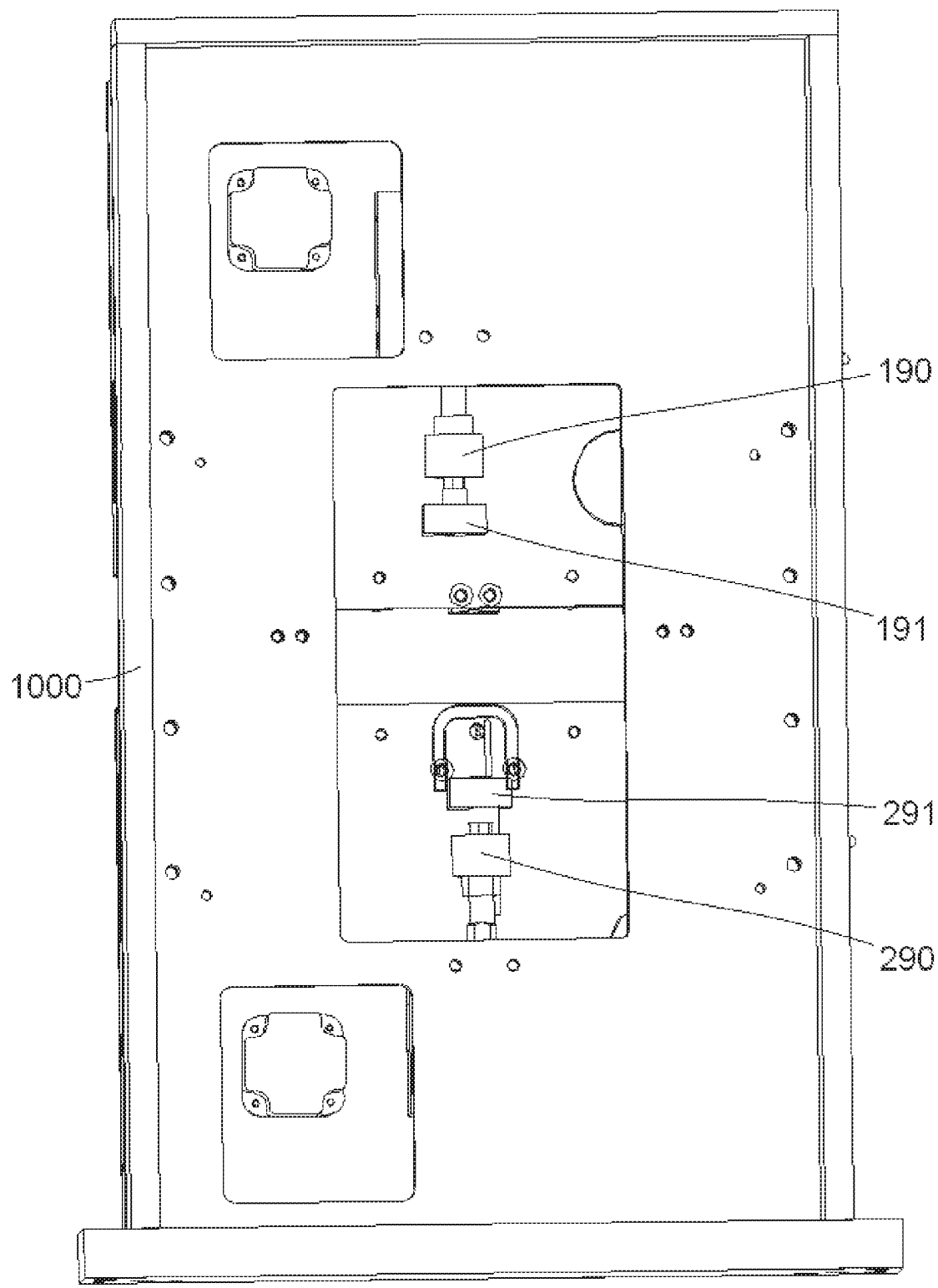
FIG. 4 is a rear view of the automatic fiber stripping system.

An automatic fiber stripping system according to the invention is shown in FIGS. 3 and 4. FIGS. 1 and 2 show a multi-bore ferrule 10 and a ribbon cable 20 used with the automatic fiber stripping system.

The multi-bore ferrule 10 shown in FIG. 1 has a plurality of bores 12 extending longitudinally along the multi-bore ferrule 10 and an injection opening 11 formed on a top of the multi-bore ferrule 10.

The ribbon cable 20 shown in FIG. 2 has a plurality of optical fibers 22 and an outer coating layer 21 covering the optical fibers 22. A length of the outer coating layer 21 is stripped off so as to expose a length of the optical fibers 22. In the described embodiment, the stripped optical fibers comprise a plurality of bare fibers 22 of a ribbon cable 20, however, the present disclosure is not limited thereto, the stripped optical fibers may also comprise a single fiber of round cable.

A ferrule assembly comprises the multi-bore ferrule 10 and the ribbon cable 20. The optical fibers 22 of the ribbon cable 20 are inserted into and secured in the bores 12 of the multi-bore ferrule 10. The optical fibers 22 are inserted from an insertion port at a rear end 10b of the multi-bore ferrule 10 and protrude by a predefined distance from a front end 10a of the multi-bore ferrule 10. Surfaces of the optical fibers 22 are required to be cleaned before the optical fibers 22 are inserted into the bores 12 of the multi-bore ferrule 10.

As shown in FIGS. 3 and 4, the automatic fiber stripping system mainly comprises a first stripping module (also referred as an upper stripping module), a second stripping module (also referred as a lower stripping module), and a plurality of heating devices 190, 290.

The first stripping module, as shown in FIG. 3, has a first stripping belt 105, a first driven belt wheel 120, a first driving belt wheel 110, and a first stripping tool 160. An unused portion of the first stripping belt, a portion which has not brought into contact with the outer coating layer 21 of the optical cable 20, is wound on the first driven belt wheel 120. A used portion of the first stripping belt, a portion which has clamped the outer coating layer 21 of the optical cable 20 and is adhered with the stripped outer coating layer 21 as described below, is wound on the first driving belt wheel 110. The first stripping tool 160 has a blade portion 161 adapted to cut a notch in at least one of two side edges of the outer coating layer 21 of the optical cable 20 and a pressing portion 162 adapted to press the first stripping belt. The first stripping belt between the first driving belt wheel 110 and the first driven belt wheel 120 is tightened on the pressing portion of the first stripping tool 160.

The second stripping module, as shown in FIG. 3, has a second stripping belt 115, a second driven belt wheel 220, a second driving belt wheel 210, and a second stripping tool 260. An unused portion of the second stripping belt, a portion which has not been brought into contact with the outer coating layer 21 of the optical cable 20, is wound on the second driven belt wheel 220. A used portion of the second stripping belt, a portion which has clamped the outer coating layer 21 of the optical cable 20 by cooperating with the first stripping tool 160 and is adhered with the stripped outer coating layer 21 as described below, is wound on the second driving belt wheel 210. The second stripping tool 260 has a blade portion adapted to cut a further notch in at least one of two side edges of the outer coating layer 21 of the optical cable 20 and a pressing portion adapted to press the second stripping belt. The second stripping belt between the second driving belt wheel 210 and the second driven belt wheel 220 is tightened at the second stripping tool 260. The blade portions of the first and/or second stripping tools 160, 260 may be constructed to cut the notches in the vertical or horizontal direction of the outer coating layer 21 of the optical cable 20 as long as the first and/or second stripping belts do not intervene in the blade portions. The first stripping belt and the second stripping belt may be a clean woven belt or any other suitable stripping belts.

The heating devices 190, 290, as shown in FIGS. 3 and 4, include a first heating device 190 and a second heating device 290. The first heating device 190 is adapted to heat the first stripping tool 160 and heat the outer coating layer 21 of the clamped optical cable 20 through the first stripping tool 160. The second heating device 290 is adapted to heat the second stripping tool 260 and heat the outer coating layer 21 of the clamped optical cable 20 through the second stripping tool 260. Heating the outer coating layer 21 of the optical cable 20 softens the outer coating layer 21. The first heating device 190 has a first heat conductive block 191 on which the first stripping tool 160 is mounted or which thermally contacts the first stripping tool 160 directly. The second heating device 290 has a second heat conductive block 291 on which the second stripping tool 260 is mounted or which thermally contacts the second stripping tool 260 directly.

As shown in FIG. 3, the first stripping module has a first sensor 170 adapted to detect whether the first stripping belt has any unused portions. The second stripping module has a second sensor 270 adapted to detect whether the second stripping belt has any unused portions. In the shown embodiment, the first sensor 170 and the second sensor 270 are visual sensors.

The first stripping module, as shown in FIG. 3, further comprises a pair of first rollers 130, 140 which are located at two sides of the first stripping tool 160. The first stripping belt is tightened on the pair of first rollers 130, 140 and the first stripping tool 160. The second stripping module has a pair of second rollers 230, 240 which are located at two sides of the second stripping tool 260. The second stripping belt 260 is tightened on the pair of second rollers 230, 240 and the second stripping tool 260.

The first stripping module, as shown in FIG. 3, has a first tightening roller 150 adapted to adjust a tension of the first stripping belt; the tension of the first stripping belt may be adjusted by fixing the first tightening roller 150 at different positions. The second stripping module has a second tightening roller 250 adapted to adjust a tension of the second stripping belt; the tension of the second stripping belt may be adjusted by fixing the second tightening roller 250 at different positions.

As shown in FIG. 3, the first stripping module is mounted on a first mounting plate 100 and the second stripping module is mounted on a second mounting plate 200. The first mounting plate 100 and the second mounting plate 200 are movable relative to each other, so that the first stripping tool 160 and the second stripping tool 260 are movable relative to each other so to loose or clamp the optical cable 20. The first mounting plate 100 and the second mounting plate 200 are movably mounted on the same vertical stationary baseplate 1000, and the first mounting plate 100 is located right above the second mounting plate 200. A rail 1100 extending vertically is arranged on the stationary baseplate 1000. A first slider 101 is arranged on the first mounting plate 100 and slidably engaged with the rail 1100 so as to move upward and downward along the rail 1100. And a second slider 201 is arranged on the second mounting plate 200 and slidably engaged with the rail 1100 so as to move upward and downward along the rail 1100. In an embodiment, the automatic fiber stripping system may further comprise a plate driving mechanism adapted to drive the first mounting plate 100 to move with respect to the stationary baseplate 1000.

The first stripping tool 160 and the second stripping tool 260 are adapted to cooperate with each other to press the first stripping belt and the second stripping belt against both sides of the optical cable 20. The optical cable 20 is clamped between the first stripping belt and the second stripping belt. While the first stripping belt and the second stripping belt are moved relative to the optical cable 20 under the drive of the first driving belt wheel 110 and the second driving belt wheel 210, the first stripping belt and the second stripping belt clamp two opposite surfaces of the outer coating layer 21, which has been formed with the notch in at least one of two side edges thereof by the blade portions of the first and/or second stripping tools 160, 260 and softened by the heating device 190, 290. The outer coating layer 21 of the optical cable 20 is automatically stripped off by the first driving belt wheel 110 and the second driving belt wheel 210.

The automatic fiber stripping system, as shown in FIG. 3, has an air-jet device 280 adapted to propel air towards the first stripping tool 160 and the second stripping tool 260. The propelled air removes residues of the outer coating layer 21 adhered on the first stripping tool 160 and the second stripping tool 260. The air-jet device 280 is mounted on one of the first mounting plate 100 and the second mounting plate 200. In the shown embodiment, the air-jet device 280 is mounted on the second mounting plate 200.

Figure 5:
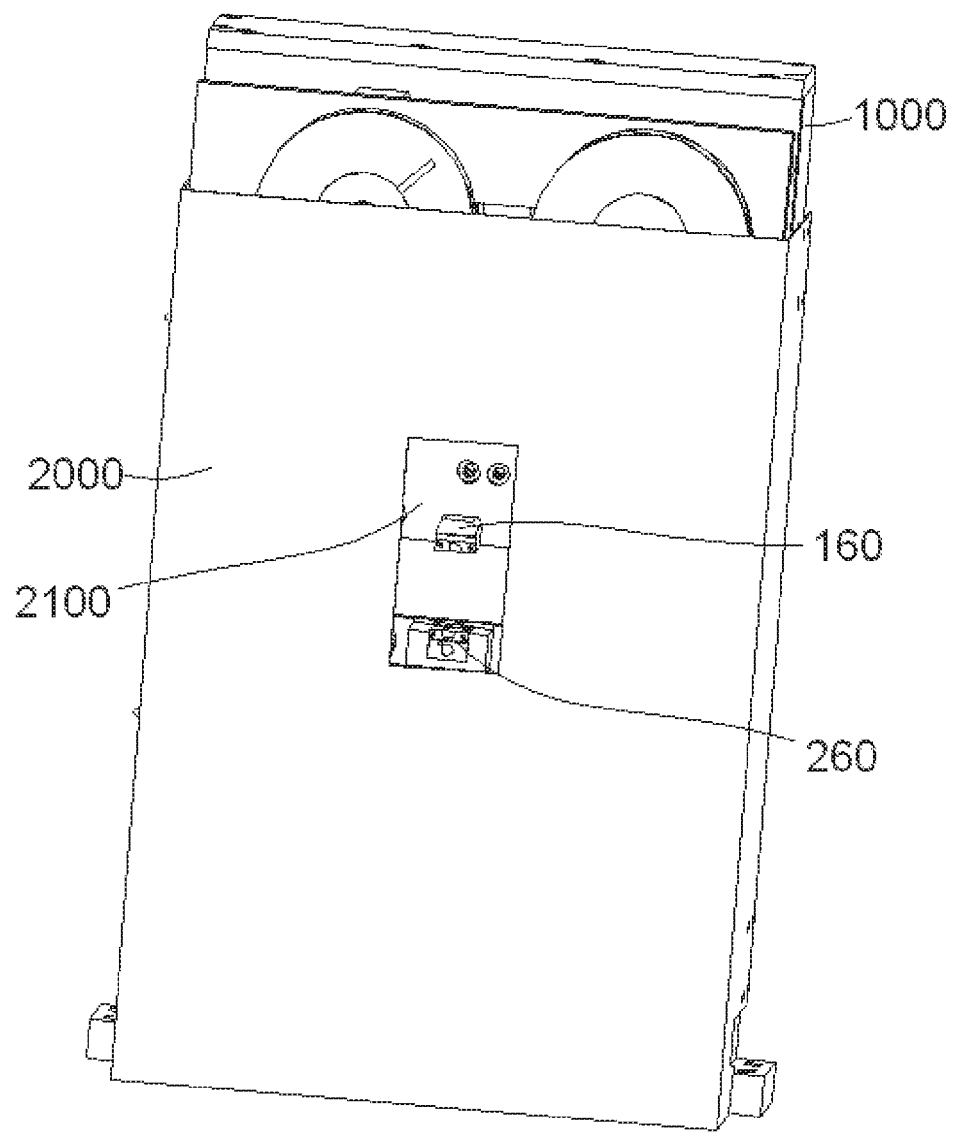
FIG. 5 is a perspective view of a cover plate with the automatic fiber stripping system.

As shown in FIGS. 3-5, the automatic fiber stripping system has a cover plate 2000 mounted on the stationary baseplate 1000. A space for receiving the first stripping module and the second stripping module is defined between the cover plate 2000 and the baseplate 1000. The residues of the outer coating layer 21 blown off the first stripping tool 160 and the second stripping tool 260 will fall into a bottom of the space. The cover plate 2000 has an opening 2100, through which the optical cable 20 is placed between the first stripping tool 160 and the second stripping tool 260.

Figure 6:
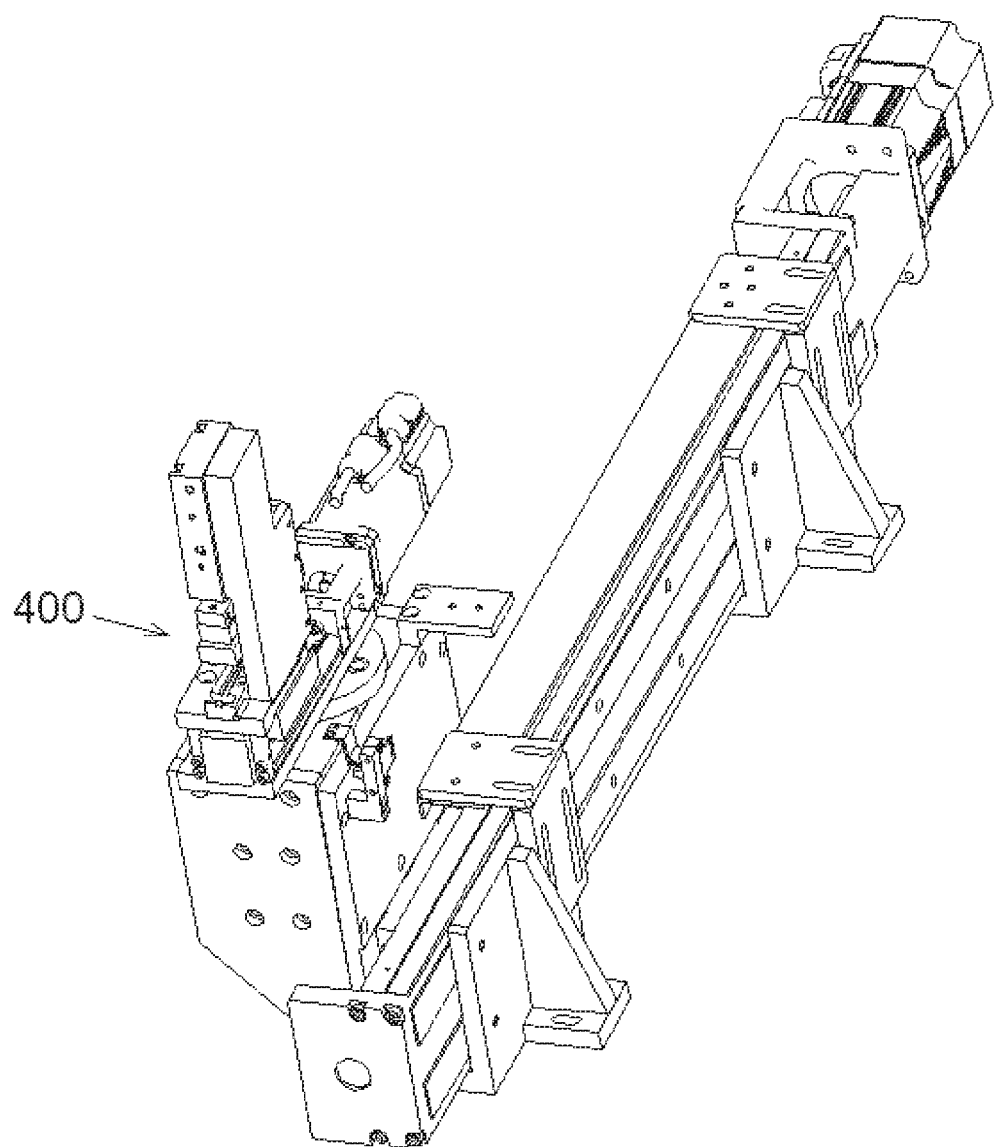
FIG. 6 is a perspective view of a cable carrying mechanism of the automatic fiber stripping system.

As shown in FIG. 6, the automatic fiber stripping system has a cable carrying mechanism 400. The cable carrying mechanism 400 is adapted to place the optical cable 20 to be stripped on the second stripping belt located right above the second stripping tool 260 and to move the stripped optical cable 20 out of the second stripping tool 260. The cable carrying mechanism 400 includes a carrier movable in a first direction, a second direction and a third direction which are perpendicular to each other. The optical cable 20 is held and fixed in a clamp of the cable carrying mechanism 400 by the carrier. In other embodiments, the cable carrying mechanism 400 may also comprise a manipulator or a robot which is adapted to hold and move the optical cable 20. The optical cable 20 is kept stationary by the cable carrying mechanism 400 during stripping off the outer coating layer 21 of the optical cable 20 with the first stripping belt and the second stripping belt.

An automatic fiber stripping method using the automatic fiber stripping system will be described with reference to FIGS. 1-6. The automatic fiber stripping method comprises steps of:

moving the first mounting plate 100 upward to separate the first stripping tool 160 and the second stripping tool 260 and separate the first tightened stripping belt and the second tightened stripping belt;

fixing the optical cable 20 to be stripped on the cable carrying mechanism 400;

placing the optical cable 20 to be stripped on the second stripping belt located right above the second stripping tool 260 by the cable carrying mechanism 400;

driving the first mounting plate 100 to move downward so as to clamp the optical cable 20 to be stripped between the first tightened stripping belt and the second tightened stripping belt;

cutting a notch in at least one of two side edges of the outer coating layer 21 of the optical cable 20 by the first stripping tool 160 and/or the second stripping tool 260;

heating the outer coating layer 21 of the optical cable 20 formed with the notch so as to soften the outer coating layer 21 of the optical cable 20;

driving the first stripping belt and the second stripping belt to move by the first driving belt wheel 110 and the second driving belt wheel 210 so as to strip off a segment of the outer coating layer 21 of the optical cable 20, which has been softened, from the notch by the first stripping belt and the second stripping belt;

moving the first mounting plate 100 upward to separate the first tightened stripping belt and the second tightened stripping belt; and removing the optical cable, the segment of the outer coating layer of which has been stripped off, by the cable carrying mechanism 400.

In other embodiments, the method may further comprise a step of:

after stripping off the segment of the outer coating layer 21 of the optical cable 20, propelling air towards the first stripping tool 160 and the second stripping tool 260 by the air-jet device 280, so as to remove residues of the outer coating layer 21 adhered on the first stripping tool 160 and the second stripping tool 260.

What is claimed is:

1. An automatic fiber stripping system, comprising:
    a first stripping module having:
        a first stripping belt;
        a first driving wheel driving the first stripping belt wound thereon;
        a first driven wheel driven by the first stripping belt wound thereon;
        a first stripping tool having:
            a blade portion adapted to cut a notch in at least one of two side edges of an outer coating layer of an optical cable; and
            a pressing portion adapted to press the first stripping belt for tightening the first stripping belt; and
        a first pair of rollers disposed on opposite sides of the first stripping tool for supporting the first stripping belt;
    a second stripping module having:
        a second stripping belt;
        a second driving wheel driving the second stripping belt wound thereon;
        a second driven wheel driven by the second stripping belt wound thereon;
        a second stripping tool having a pressing portion adapted to press the second stripping belt for tightening the second stripping belt, the first stripping tool and the second stripping tool configured to press the first stripping belt and the second stripping belt on each of two opposite sides of the optical cable for clamping the optical cable between the first stripping belt and the second stripping belt; and
        a second pair of roller disposed on opposite sides of the second stripping tool for supporting the second stripping belt; and
    a heating device configured to heat and soften the outer coating layer of the optical cable, the first driving wheel and the second driving wheel configured to drive the first stripping belt and the second stripping belt, so as to strip off a segment of the outer coating layer from the notch which has been softened by the heating device.

2. The automatic fiber stripping system of claim 1, wherein the first stripping module is mounted on a first mounting plate and the second stripping module is mounted on a second mounting plate, and the first mounting plate and the second mounting plate are movable relative to each other such that the first stripping tool and the second stripping tool are movable relative to each other so as to selectively clamp the optical cable.

3. The automatic fiber stripping system of claim 2, wherein the first mounting plate and the second mounting plate are movably mounted on a same stationary baseplate and the first mounting plate is located above the second mounting plate.

4. The automatic fiber stripping system of claim 3, wherein the stationary baseplate has a rail extending vertically, the first mounting plate has a first slider slidably engaged with the rail so as to move upward and downward along the rail, and the second mounting plate has a second slider slidably engaged with the rail so as to move upward and downward along the rail.

5. The automatic fiber stripping system of claim 3, further comprising a cover plate mounted on the stationary baseplate, a space for receiving the first stripping module and the second stripping module is defined between the cover plate and the baseplate and the cover plate has an opening through which the cable is placed between the first stripping tool and the second stripping tool.

6. The automatic fiber stripping system of claim 2, further comprising a plate driving mechanism adapted to drive movement of the first mounting plate.

7. The automatic fiber stripping system of claim 1, further comprising an air-jet device adapted to propel air towards the first stripping tool and the second stripping tool.

8. The automatic fiber stripping system of claim 7, wherein the air-jet device is mounted on one of the first mounting plate and the second mounting plate.

9. The automatic fiber stripping system of claim 1, further comprising a cable carrying mechanism adapted to place the optical cable to be stripped on the second stripping tool and to move the stripped optical cable out of the second stripping tool.

10. The automatic fiber stripping system of claim 1, wherein the second stripping tool has a blade portion adapted to cut a further notch in at least one of the two side edges of the outer coating layer.

11. The automatic fiber stripping system of claim 1, wherein the first stripping module has a first tightening roller moveable between a plurality of positions relative to the first stripping tool and engaging with the first stripping belt to adjust a tension of the first stripping belt and the second stripping module has a second tightening roller moveable between a plurality of positions relative to the second stripping tool and engaging with the second stripping belt to adjust a tension of the second stripping belt.

12. An automatic fiber stripping system, comprising:
a first stripping module mounted on a first mounting plate and having:
   a first stripping belt;
   a first driving wheel driving the first stripping belt wound thereon;
   a first driven wheel driven by the first stripping belt wound thereon; and
   a first stripping tool having:
      a blade portion adapted to cut a notch in at least one of two side edges of an outer coating layer of an optical cable; and
      a pressing portion adapted to press the first stripping belt for tightening the first stripping belt; and
a second stripping module mounted on a second mounting plate and having:
   a second stripping belt;
   a second driving wheel driving the second stripping belt wound thereon;
   a second driven wheel driven by the second stripping belt wound thereon; and
   a second stripping tool having a pressing portion adapted to press the second stripping belt for tightening the second stripping belt, the first stripping tool and the second stripping tool configured to press the first stripping belt and the second stripping belt on each of two opposite sides of the optical cable for clamping the optical cable between the first stripping belt and the second stripping belt; and
a heating device configured to heat and soften the outer coating layer of the optical cable, the first driving wheel and the second driving wheel configured to drive the first stripping belt and the second stripping belt, so as to strip off a segment of the outer coating layer from the notch which has been softened by the heating device, wherein the first mounting plate and the second mounting plate are movable relative to each other such that the first stripping tool and the second stripping tool are movable relative to each other so as to selectively clamp the optical cable.

13. The automatic fiber stripping system of claim 12, wherein the heating device has a first heating device adapted to heat the first stripping tool and the outer coating layer of the optical cable through the first stripping tool, and a second heating device adapted to heat the second stripping tool and the outer coating layer of the optical cable through the second stripping tool.

14. The automatic fiber stripping system of claim 13, wherein the first heating device has a first heat conductive block and the first stripping tool is mounted on the first heat conductive block or directly thermally contacts the first heat conductive block, and the second heating device has a second heat conductive block and the second stripping tool is mounted on the second heat conductive block or directly thermally contacts the second heat conductive block.

15. The automatic fiber stripping system of claim 12, wherein the first stripping module has a pair of first rollers disposed on opposite sides of the first stripping tool for supporting the first stripping belt, and the second stripping module has a pair of second rollers disposed on opposite sides of the second stripping tool for supporting the second stripping belt.

16. The automatic fiber stripping system of claim 12, wherein the first stripping module has a first tightening roller moveable between a plurality of positions relative to the first stripping tool and engaging with the first stripping belt to adjust a tension of the first stripping belt and the second stripping module has a second tightening roller moveable between a plurality of positions relative to the second stripping tool and engaging with the second stripping belt to adjust a tension of the second stripping belt.

17. The automatic fiber stripping system of claim 12, wherein the first mounting plate and the second mounting plate are movably mounted on a same stationary baseplate and the first mounting plate is located above the second mounting plate.

* * * * *